United States Patent [19]
Motzer

[11] 3,916,946
[45] Nov. 4, 1975

[54] SAFETY CHECK VALVE FOR PRESSURE FLUID OPERATED APPARATUS IN PARTICULAR PRESSES

[75] Inventor: Helmut Motzer, Echterdingen, Germany

[73] Assignee: Herion-Werke KB, Germany

[22] Filed: Nov. 16, 1973

[21] Appl. No.: 416,653

[30] Foreign Application Priority Data
Feb. 26, 1973 Germany............................ 2309552

[52] U.S. Cl. ............. 137/512.2; 137/522; 137/538; 137/554
[51] Int. Cl.[2]......................................... F16K 15/18
[58] Field of Search ........ 137/512, 512.2, 522, 523, 137/554, 614.17, 538, 540, 495; 251/63, 63.5, 63.6

[56] References Cited
UNITED STATES PATENTS

| | | | |
|---|---|---|---|
| 2,306,012 | 12/1942 | Campbell............................ | 137/512 |
| 2,458,763 | 1/1949 | Birman ............................. | 137/522 X |
| 2,724,239 | 11/1955 | Fox................................. | 137/538 X |
| 2,930,401 | 3/1960 | Cowan.............................. | 137/540 |
| 3,476,142 | 11/1969 | Schultz............................. | 137/512 |
| 3,669,506 | 6/1972 | Papin et al........................ | 137/495 X |
| 3,706,321 | 12/1972 | Vicari.............................. | 137/554 |
| 3,749,121 | 7/1973 | Frankewich ....................... | 137/512.2 |
| 3,789,875 | 2/1974 | McGee............................... | 137/554 |
| 3,801,233 | 4/1974 | Simpson............................ | 137/540 X |

FOREIGN PATENTS OR APPLICATIONS
19,931   6/1907   United Kingdom................. 137/512

*Primary Examiner*—William R. Cline
*Attorney, Agent, or Firm*—Robert E. Burns; Emmanuel J. Lobato; Bruce L. Adams

[57] ABSTRACT

A safety check valve for pressure operated apparatus, in particular presses comprises two axially disposed control pistons movable axially independently of one another in a cylindrical housing having a fluid inlet at one end and an outlet at the other. One of the control pistons has a closed end engageable with a first valve seat surrounding the inlet opening of the housing, an axial bore surrounded by a second valve seat at the opposite end of the piston and at least one radial hole communicating with the axial bore. The other control piston has a closed end engageable with the second valve seat, an axial bore opening at the opposite end of the piston and at least one radial hole. The control pistons are spring biased toward their respective valve seats and are movable against the bias by fluid pressure. With this arrangement either control piston will check the return flow of fluid regardless of the position of the other.

11 Claims, 4 Drawing Figures

SAFETY CHECK VALVE FOR PRESSURE FLUID OPERATED APPARATUS IN PARTICULAR PRESSES

FIELD OF INVENTION

The present invention relates to safety check valves for pressure fluid operated apparatus, in particular presses, to permit the flow of fluid in one direction but checking the return flow.

BACKGROUND OF INVENTION

The control of presses has heretofore been effected by parallel connected valves with electrical supervision whereby the press will be relieved of pressure or turned off when a disturbance or malfunctioning occurs in either of the two valves. The press can then be put back into operation only when such disturbance has been removed. Protection for the press dies is provided by a check valve which prevents abnormal lowering of the press dies. If there is a disturbance or malfunctioning of the check valve, there is the danger that the press dies descend more or less rapidly which can lead to serious accidents and to damaging of the press.

SUMMARY OF INVENTION

It is an object of the present invention to provide a safety check valve that works dependably and reliably even if there is a malfunctioning of one of its control elements.

In accordance with the invention, dependable and reliable operation of the safety check valve is assured by providing two independently axially slidable control pistons arranged axially one behind the other in a housing. Preferably, the first control piston in the direction of fluid flow cooperates with a valve seat formed in the housing and has its rear end formed as a valve seat for the second control piston. Each of the control pistons has a closed end cooperating with the respective valve seat and an axial bore extending to the opposite end of the control piston with at least one radial opening communicating with the axial bore. Each of the control pistons is preferably individually biased in a direction to close the valve by springs provided in the housing. Moreover, the control pistons are preferably provided with control surfaces which are acted on by pressure fluid admitted through control channels in the housing to move the control pistons in a direction to open the valve. These control surfaces are preferably of larger area than the working faces of the corresponding valve seats. Finally, there is preferably provided an electrical switch which is actuable by one of the two control pistons in the event of any disturbance or malfunctioning of either of the control pistons.

Through the arrangement of two independently movable control pistons one behind the other, the dependability of operation of the check valve is increased as each of the two control pistons is operable individually to perform the closing function of the check valve so that even if one of the two control pistons is out of action the other will reliably close the check valve.

BRIEF DESCRIPTION OF DRAWINGS

The nature, objects and advantages of the invention will be more fully understood from the following description of a safety check valve in accordance with the invention shown by way of example in the drawings in which.

DESCRIPTION OF PREFERRED EMBODIMENT

Figure 1:
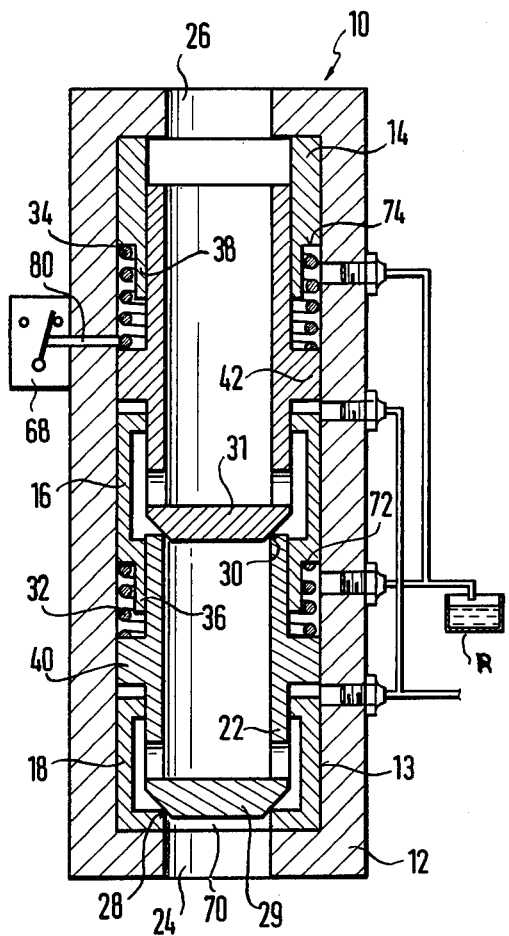
FIG. 1 is a longitudinal section of a preferred embodiment of check valves in accordance with the invention shown in closed position.
Figure 2:
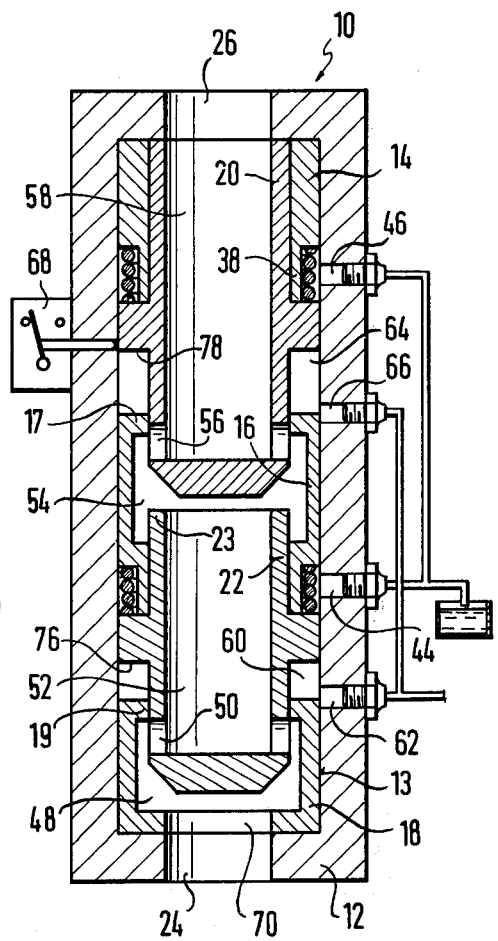
FIG. 2 is a similar section showing the valve in working position.

The safety check valve 10 shown by way of example in FIGS. 1 and 2 has a cylindrical housing 12 made of suitable material, for example metal with an inlet opening 24 at one end of the housing and an outlet opening 26 at the opposite end. Axially spaced bushings 14, 16 and 18 are provided in a longitudinally extending bore 13 of the housing and are suitably secured in place, for example by a press fit, adhesive or welding.

Two control pistons 20 and 22 are guided by the bushings 14, 16 and 18. The pistons are in axial alignment one behind the other and are movable in an axial direction independently of one another. The pistons have a close sliding fit with the bushings. The control piston 20 is guided by the bushing 14 and a part 17 of the bushing 16 while the control piston 22 is guided by the bushing 16 and a part 19 of the bushing 18. The bushing 18 is provided with an opening 70 which corresponds to and is aligned with the inlet opening 24 of the housing and which is formed as a valve seat 28 for a conical head 29 of the control piston 22. The rear or downstream end 23 of the control piston 22 is formed as a valve seat 30 (FIG. 1) for a conical head 31 of the control piston 20.

One end of a compression spring 32 bears on an annular shoulder 72 of the bushing 16 while the other end bears on a radial collar 40 of the control piston 22. The spring 32 is guided by an axial extension 36 of the bushing 16. One end of a second compression spring 34 bears on an annular shoulder 74 of the bushing 14 while the other end bears on a radial collar 42 of the control piston 20. The spring 34 is guided by an axial extension 38 of the bushing 14. It will be seen that the spring 32 biases the control piston 22 toward the valve seat 28 while the spring 34 biases the control piston 20 toward the valve seat 28 while the spring 34 biases the control piston 20 toward the valve seat 30. The annular spaces in which the springs 32 and 34 are arranged are respectively vented through bores 44 and 46 formed in the housing 12 or are connected with a receptacle R for the pressure medium.

The control piston 22 is provided with a central bore 52 extending axially from the head 49 to the valve seat 30 which surrounds the rear end of the bore. At least one radial opening 50 extends through the wall of the control piston and communicates with the axial bore 52, two such radial openings being shown in the drawings. The control piston 20 is provided with a central bore 58 which extends from the head 31 to the opposite end of the piston. The wall of the piston is provided with at least one radial opening 56 which communicates with the longitudinal bore 58, two such radial openings being shown in the drawings.

Between the end 19 of the bushing 18 and the collar 40 of the control piston 22 there is formed an annular control chamber 60 which is connected by a control channel 62 in the housing 12 with a controllable supply of pressure fluid (not shown). Likewise, between the end 17 of the bushing 16 and the collar 42 of the control piston 20 there is formed an annular control chamber 64 which is connected by a control channel 66 with the controllable source of fluid pressure. The annular control channels 60 and 64 are bounded by the outer walls of the control pistons and the inner wall of the housing. It will be seen that the lower surface 76 of the collar 40 and the lower surface 78 of the collar 42 constitute annular control surfaces by means of which the pistons can be moved away from the respective valve seats against the bias of the compression springs 32 and 34 by the introduction of pressure fluid through the control channels 62 and 66.

The safety check valve in accordance with the present invention operates in the following manner. In the position of the check valve shown in FIG. 1, the control piston 22 is pressed against its valve seat 28 by the spring 32 while the control piston 20 is pressed against its valve seat 30 by the spring 34. The check valve is thus closed. In order to actuate the fluid pressure operated apparatus, for example to raise the cylinder of a press, fluid pressure is supplied by a pump or other pressure source (not shown) to the inlet opening 24 of the valve. As the pressure builds up, the control piston 22 is lifted from its seat 28 against the bias of the spring 32 and the inlet 24 is thereby opened. The pressure fluid thereupon flows through the inlet opening 24, the opening 7, the annular chamber 48 and the radial openings 50 into the axial bore 52 of the control piston 22 which by this operation is lifted against the force of the pressure spring 32 and carries with it the control piston 20 whereby the pressure spring 34 is also compressed. The control piston 22 is thereby raised until the collar 40 engages the extension 36 of the bushing 16.

The pressure of the pressure fluid in the axial bore 52 of the control piston 22 now lifts the control piston 20 against the force of the pressure spring 34 from its valve seat 30 whereby the latter is opened and the pressure fluid flows over the valve seat, through the annular chamber 54, the radial openings 56 and the axial bore 58 of the control piston 20 to the outlet opening 26 and from there to the fluid pressure operated apparatus. The control piston 20 is raised until the collar 42 engages the extension 30 of the bushing 14.

This condition of the check valve in which both of the valve seats 28 and 30 are open and the pressure fluid flows from the inlet opening 24 to the outlet opening 26 is shown in FIG. 2. Both control pistons are held in open position through the pressure of the pressure fluid. When the pressure of the pressure fluid in the inlet opening is abated or disappears, the control pistons will be pressed against their valve seats 28 and 30 by the pressure springs 32 and 34 as also by the pressure of the pressure fluid in the outlet opening whereby the check valve is closed.

When the press cylinder is to be lowered, pressure fluid is admitted to the annular control chambers 60 and 64 through their corresponding control channels 62 and 66. The control pistons are thereby raised against the force of the springs 32 and 34 and against the force of the pressure fluid which acts on the working faces of the valve seats 28 and 30 whereby both valve seats are opened and the fluid can flow freely from the outlet opening 26 to the inlet opening 24. The annular control faces 76 and 78 which are formed by the collars 40 and 42 are selected of sufficiently large area that upon controlled lifting of both of the control pistons, the above mentioned counter-forces can be overcome whereby also the control pressure can, if desired, be varied. If the controlled downward movement of the press cylinder is to be suddenly stopped, the control pressure to the control chambers 60 and 64 is reduced by a suitable two-way valve (not shown) whereupon the control pistons close the valve.

Figure 3:
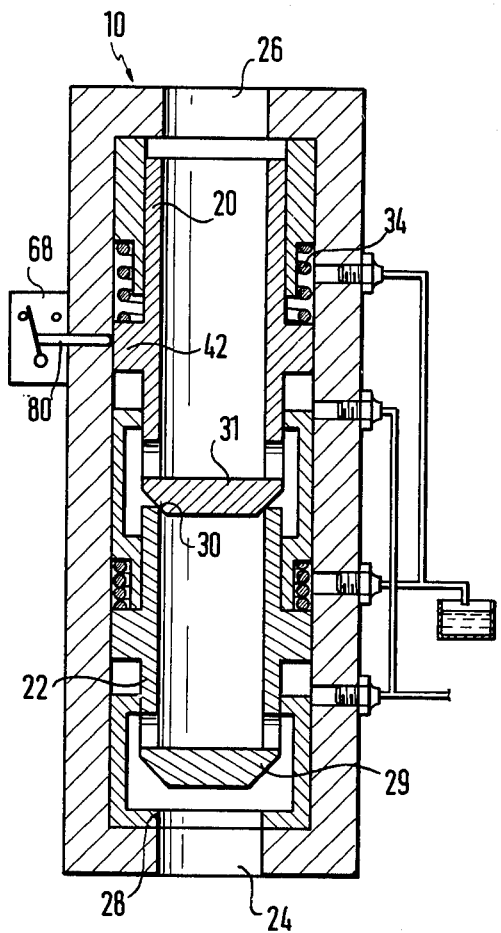
FIGS. 3 and 4 are similar sections showing the valve of FIG. 1 in two different malfunctioning positions.
Figure 4:
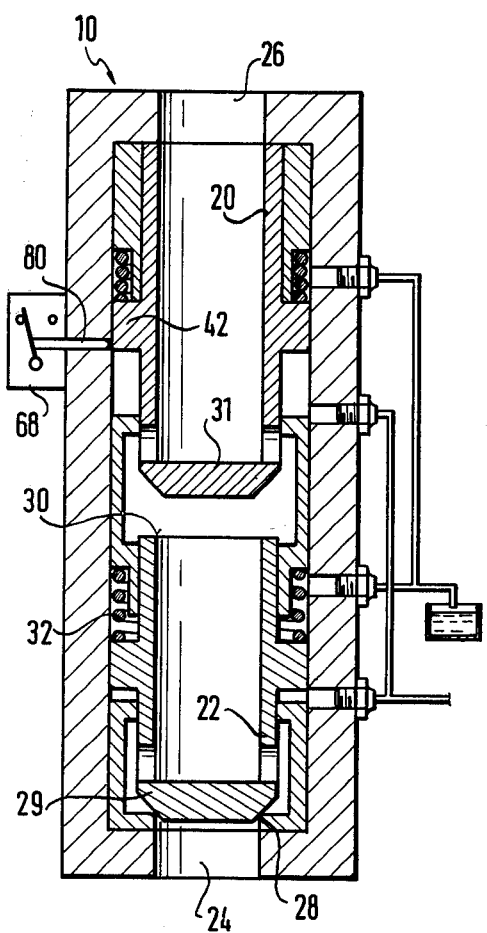

If a disturbance or malfunctioning of one of the two control pistons occurs, the other piston closes the valve as shown in FIGS. 3 and 4 which illustrated two different malfunctionings. In FIG. 3 the control piston 22 is shown stuck in the open position through some fault so that the valve seat 28 remains open. Despite this the pressure fluid cannot flow back from the outlet opening 26 to the inlet opening 24 because the control piston 20, which is not subject to any disturbance, is pressed against its valve seat 30 by the spring 34 and the pressure of the fluid in the discharge conduit so that the valve seat 30 is closed. The closed valve seat 30 prevents the return flow of pressure fluid in the direction from the outlet opening 26 to the inlet opening 24. The check valve is thereby reliably closed.

In FIG. 4 there is shown a condition in which upon decrease of pressure in the supply conduit or in the control channels the control piston 20 has stuck in open position by reason of some disturbance so that the valve seat 30 is not closed. The control piston 22, which is not subject to the disturbance, is however pressed against its valve seat 28 through its pressure spring 32 and through the pressure of the pressure fluid in the outlet conduit whereby the valve seat 28 is closed. The valve is thus closed and no return flow of pressure fluid from the outlet opening 26 to the inlet opening 24 is possible.

The check valve is preferably provided with an electric switch 60 through which any malfunctioning of the valve can be indicated. In the position shown in FIG. 1 in which both valve seats 28 and 30 are closed, the electrical switch 68 is in its right hand end position while when both valve seats are open (FIG. 2) or when one of the two valve seats is open (FIGS. 3 and 4) the switch is in its left end position to which it is moved through engagement of the collar 42 with a trip pin 80 which extends through a bore in the wall of the valve housing. There is thus provided an indication of the condition of the check valve.

While a preferred embodiment of the invention has been illustrated in the drawings and is herein particularly described, it will be understood that many modifications may be made and that the invention is in no way limited to the illustrated embodiment.

What I claim and desire to secure by Letters Patent is:

1. A safety check valve for controlling flow of pressure fluid in a supply line for pressure fluid operated apparatus, in particular presses, comprising a cylindrical housing with an axial bore, an inlet opening at one end of said bore and an outlet opening at the opposite end of said bore, said bore providing a fluid passageway through the housing between said inlet opening and said outlet opening, first and second control pistons disposed in tandem in said bore between said inlet opening and said outlet opening, each of said control pistons having at the end thereof nearest said inlet opening a valve portion with a working face, a first annular valve seat surrounding said inlet opening and engageable by the working face of the valve portion of said first control piston to close said passageway, a second annular valve seat located between said inlet opening and said outlet opening and engageable by the working face of the valve portion of said second control piston to close said passageway, means biasing the first and second control pistons toward their respective valve seats to close the valve, said pistons being movable by line pressure applied through said inlet opening and acting on said working faces of said valve portions in a direction against the bias of said biasing means to open said valve and being urged against said valve seats by line pressure applied in the reverse direction through said outlet opening to close said valve and thereby prevent flow of line fluid in said reverse direction, said control pistons having control surfaces isolated from said passageway and from line pressure, and controllable means for exerting fluid pressure on said control surfaces to move said control pistons against line pressure applied through said outlet opening and against the bias of said biasing means to open the valve and thereby permit controlled flow of said line fluid in said reverse direction.

2. A safety check valve according to claim 1, in which each of said control pistons has a central bore closed at the end of said control piston engageable with said respective valve seat and open at the other end and at least one radial opening communicating with said central bore.

3. A check valve according to claim 2, in which said second valve seat is provided on the end of said first control piston opposite said closed end thereof and surrounds the bore in said first control piston.

4. A safety check valve according to claim 1, in which said biasing means comprises spring means acting between said housing and the respective control pistons to individually bias said control pistons toward the respective valve seats.

5. A safety check valve according to claim 1, in which said control surfaces are of greater area than the working faces of said valve portions.

6. A safety check valve according to claim 1, in which each of said control pistons has intermediate its ends an annular collar having one axial face against which said biasing means presses and an opposite face constituting said control surface.

7. A safety check valve according to claim 1, comprising electric switch means actuable by one of said control pistons to provide an electric signal upon faulty operation of either of said control pistons.

8. A check valve according to claim 1, in which each of said control pistons has a central bore closed at one end by said valve portion of the respective piston and open at the opposite end, an annular peripheral surface spaced from said valve portion and in sliding engagement with said axial bore of the housing and at least one radial opening communicating with said central bore and located between said valve portion and said annular peripheral surface, said second valve seat on which the working face of the valve portion of said second control piston seats being on the end of said first control piston opposite said valve portion thereof and surrounding said opposite open end of said central bore of said first control piston, whereby each of said control piston is operable to check flow of fluid in a direction from said outlet opening to said inlet opening independently of the position of the other of said control pistons.

9. A safety check valve according to claim 8, in which said biasing means comprises spring means acting between said housing and the respective control pistons individually to bias said control pistons in a direction toward said first valve seat.

10. A safety check valve according to claim 8, comprising electric switch means actuatable by said second control piston when in any position other than the position nearest to said first valve seat to provide an electric signal when either control piston is in a position other than a position to close said passageway.

11. A check valve according to claim 1, in which said housing comprises an annular control chamber surrounding each of said control pistons and isolated from said passageway, and in which each of said control surfaces is an annular surface on the respective piston defining a wall of the respective control chamber surrounding said piston, said controllable means comprising means for supplying pressure fluid to said control chambers.

* * * * *